T. K. IRWIN.
APPARATUS FOR TREATING SEWAGE AND OTHER WASTE LIQUIDS.
APPLICATION FILED SEPT. 4, 1914.

1,220,990.

Patented Mar. 27, 1917.

Witnesses
Jas. K. McCathran
J. K. Siggers

Thomas Kemplay Irwin, Inventor
By C. G. Siggers
Atty.

UNITED STATES PATENT OFFICE.

THOMAS KEMPLAY IRWIN, OF LONDON, ENGLAND, ASSIGNOR TO ANGLO-CONTINENTAL FERTILIZERS SYNDICATE LIMITED, OF LONDON, ENGLAND.

APPARATUS FOR TREATING SEWAGE AND OTHER WASTE LIQUIDS.

1,220,990.            Specification of Letters Patent.      Patented Mar. 27, 1917.

Application filed September 4, 1914. Serial No. 860,221.

*To all whom it may concern:*

Be it known that I, THOMAS KEMPLAY IRWIN, a subject of His Majesty the King of England, residing at 5 London Wall Buildings, in the city of London, Kingdom of England, have invented certain new and useful Improvements in or Relating to an Apparatus for Treating Sewage and other Waste Liquids, of which the following is a specification.

This invention relates to improvements in apparatus for treating sewage and other waste liquids.

In carrying out the present invention I provide means such as a pump for regulating the flow of liquid to be treated; means for the admixture of precipitants or neutralizing media; a precipitation tank; a filter bed preferably provided with a screen; means for aerating the liquid; and a second filter bed also preferably provided with a screen.

The invention consists in the particular combination of apparatus hereinafter described and more particularly pointed out in the claims, no claim *per se* being made to any individual feature.

The invention is hereinafter described with reference to the accompanying drawings in which:—

Figure 1:
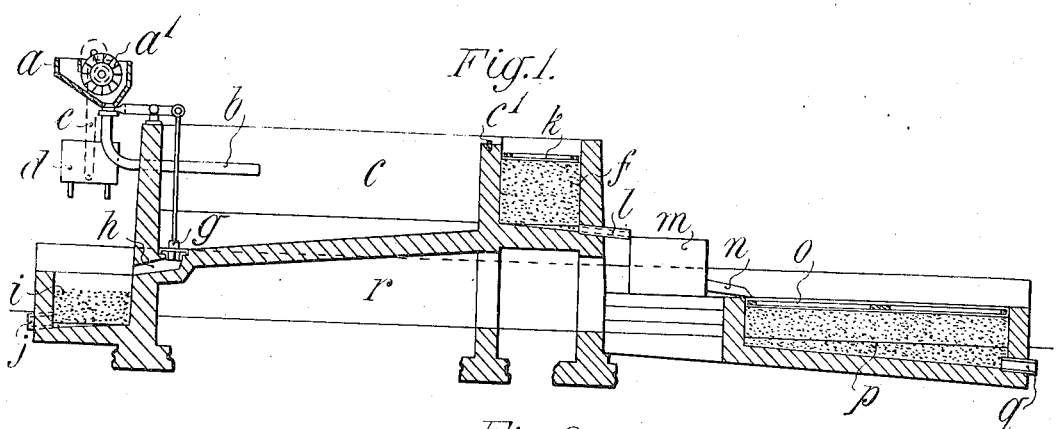
Figure 1 is a diagrammatic sectional elevation of the improved plant.
Figure 2:
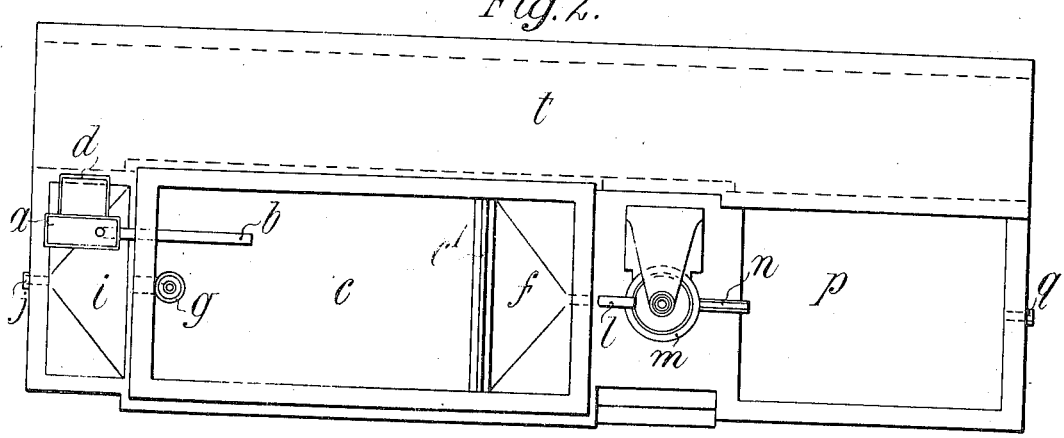
Fig. 2 is a plan view thereof.
Figure 3:
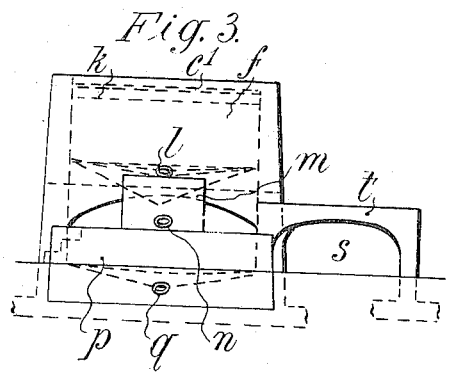
Fig. 3 is a partial elevation taken at right angles to Fig. 1.

The liquid to be treated is fed, by means of a pump or other suitable measuring device, drawing on a sump or other collecting chamber or reservoir, into a tank or vessel $a$ from which it passes by way of a conduit $b$ into a precipitation tank $c$. The precipitant used may be contained in the tank $a$ and may be dissolved by the liquid passing over it or it may in the manner shown in the drawings be contained within a separate tank $d$ from which it is delivered into the tank $a$ as required in measured quantities by means of a suitable feed apparatus such for instance as the endless conveyer $e$, and the liquid and the precipitant are then mixed together by means of a revolving mixer device $a'$ which may be operated by the liquid itself before passing to the tank $c$. Some sewages require neutralization and the media to effect this may be introduced in the same manner as the precipitant. This neutralization may be effected either by allowing the sewage to stand and septic action to set in or by the addition of fermentable matter or a suitable bacteriological culture.

The tank $c$ into which the mixture is then led is of sufficient dimensions to permit the precipitation to take place and the effluent to pass off at the top $c'$ into a filter $f$. Means, such as the manually operated outlet valve $g$, are provided for the continuous or periodical removal from the said tank $c$ of the precipitated solids and these may as shown pass by means of the conduit $h$ into a well or chamber $i$ which may contain sand and from which the remaining liquids can pass out by way of a drain $j$ as shown.

The filter $f$ may be constructed of any suitable material such as sand and it is preferably provided on its surface with a screen of fine netting $k$ overspread with a layer of fine sand or other medium through which the effluent from the precipitation tank $c$ must pass before reaching the filtering sand or other material. The effect of this screen $k$ is to intercept a large proportion of the remaining solids in suspension. Suitable chemicals may be utilized in the layer of fine sand on the screen $k$ to accentuate this action and to effect further purification of the liquid. The filter may be of any suitable form and any of the well known means of distribution may be employed.

The effluent from the filter $f$ is conducted by means of the conduit $l$ into a centrifugal machine $m$ for effecting its aeration. The apparatus of this invention may include any suitable aerating or agitating machine which will thoroughly oxidize the liquid delivered from the adjacent filter and which will so break up the liquid as to enable the ready separation of any remaining solid particles contained in the liquid passing through the machine. However, it is preferred to use in this connection the centrifugal machine shown in United States Letters Patent No. 1,129,682, granted to me on February 23, 1915. After aeration the liquid flows through a conduit $n$ through another screen *o* and filter *p* constructed similarly to that previously described and from which it issues at *q* fully clarified and oxidized.

The solids collected by the screens may be removed periodically and the layers of sand renewed and the said solids may be mixed with those from the precipitation tank *c* and the whole, when dried, will constitute a valuable fertilizing medium.

Precipitation may be accelerated and improved in the tank *c* by raising the temperature of the sewage and for this purpose the tank *c* is located over a space *r* permitting heat to be applied to the tank *c*. There is also provided a drying floor *t* with a space *s* thereunder, so that the floor may be heated, and this drying floor is utilized for drying the precipitated solids.

What I claim as my invention and desire to secure by Letters Patent of the United State is:—

1. An apparatus for the treatment of sewage and other waste liquids, comprising a precipitating tank and means for directing sewage and a precipitating medium thereinto, said tank having an overflow at the end remote from that receiving the sewage and precipitant and also having means for the removal of precipitates, a filter chamber for receiving the precipitates and retaining the solid portions thereof, a filter chamber receiving the overflow from the precipitating tank, aerating means for receiving the filtered overflow, and another filter for receiving the aerated liquid.

2. An apparatus for the treatment of sewage and other waste liquids, comprising a precipitating tank and means for directing sewage and a precipitating medium thereinto, said tank having an overflow at the end remote from that receiving the sewage and precipitant and also having means for the removal of precipitates, a filter chamber for receiving the precipitates and retaining the solid portions thereof, a filter chamber receiving the overflow from the precipitating tank, aerating means for receiving the filtered overflow, and another filter for receiving the aerated liquid, the apparatus also including an elevated drying floor for the solid matters removed from the sewage and the precipitating chamber having an underlying chamber communicating with the space beneath the drying floor, whereby heat may be applied to the precipitating chamber and also caused to act on the drying floor to drive off moisture from the solid matters on said drying floor.

3. Apparatus for the treatment of sewage and other waste liquids comprising in combination means for mixing the liquid with precipitants and for feeding the resulting mixture to a precipitation tank in which the solid and liquid portions are separated, a filter bed for the reception of the effluent from the said precipitation tank, centrifugal aerating apparatus for treating the liquid from the said filter bed, another filter bed for treating the aerated liquid, the solid portions being intercepted at the precipitation tank and the two aforesaid filters, a drying floor arranged longitudinally of the apparatus and extending past the filters and the precipitation tank to receive the separated solids therefrom, and means for raising the temperature of the sewage in the precipitation tank, and the solid matter on the drying floor to accelerate and increase the process of precipitation, and the drying out of the solid matter, substantially as described.

4. An apparatus for the treatment of sewage, comprising a precipitating tank decreasing in depth from one end toward the other with means at the deeper end for introducing the sewage and material for treating the same, said tank having means at the deeper end for withdrawing precipitates therefrom, means for draining the precipitates and retaining the solid portions thereof, a filter at the shallow end of the tank for receiving liquid and other matters overflowing from the tank, aerating means in position to receive liquid from said filter, and another filter in position to receive the aerated liquid.

5. An apparatus for the treatment of sewage, comprising a precipitating tank decreasing in depth from one end toward the other with means at the deeper end for introducing the sewage and material for treating the same, said tank having means at the deeper end for withdrawing precipitates therefrom, means for draining the precipitates and retaining the solid portions thereof, a filter at the shallow end of the tank for receiving liquid matters overflowing from the tank, aerating means in position to receive liquid from said filter, and another filter in position to receive the aerated liquid, the apparatus being provided with a drying floor alongside of the tank and filters and said tank and drying floor having chambers therebeneath for the application and circulation of a heating medium.

In testimony whereof I have signed this specification in the presence of two subscribing witnesses.

THOMAS KEMPLAY IRWIN.

Witnesses:
J. S. WITHERS,
FRANK BLAKEY.